(12) United States Patent
Belur

(10) Patent No.: US 9,639,453 B2
(45) Date of Patent: May 2, 2017

(54) METHOD AND SYSTEM FOR DETERMINING FUNCTIONAL TESTS TO EXECUTE BASED ON CODE COVERAGE

(71) Applicant: VMware, Inc., Palo Alto, CA (US)

(72) Inventor: Rekha Belur, Los Altos Hills, CA (US)

(73) Assignee: VMware, Inc., Palo Alto, CA (US)

( * ) Notice: Subject to any disclaimer, the term of this patent is extended or adjusted under 35 U.S.C. 154(b) by 56 days.

(21) Appl. No.: 14/638,442

(22) Filed: Mar. 4, 2015

(65) Prior Publication Data

US 2016/0259713 A1 Sep. 8, 2016

(51) Int. Cl.
*G06F 11/36* (2006.01)
*G06F 9/44* (2006.01)

(52) U.S. Cl.
CPC .......... *G06F 11/3676* (2013.01); *G06F 8/00* (2013.01); *G06F 11/368* (2013.01); *G06F 11/3644* (2013.01)

(58) Field of Classification Search
None
See application file for complete search history.

(56) References Cited

U.S. PATENT DOCUMENTS

| | | | | |
|---|---|---|---|---|
| 2004/0024868 A1* | 2/2004 | Drummond, II | .... | H04L 12/2697 709/224 |
| 2004/0268308 A1* | 12/2004 | Srivastava | ............ | G06F 11/368 717/120 |
| 2007/0033443 A1* | 2/2007 | Tillmann | ............ | G06F 11/3684 714/45 |
| 2014/0115565 A1* | 4/2014 | Abraham | ................. | G06F 8/30 717/128 |
| 2014/0229566 A1* | 8/2014 | Ustalov | ................... | G06F 3/067 709/216 |
| 2014/0351793 A1* | 11/2014 | Bartley | ............... | G06F 11/3676 717/124 |

OTHER PUBLICATIONS

About Code Coverage, last modified Apr 11, 2014. [Retrieved on Jul. 28, 2015]. Retrieved from the Internet: <https://confluence.atlassian.com/display/CLOVER/About+Code+Coverage>.

* cited by examiner

*Primary Examiner* — Shih-Wei Kraft
(74) *Attorney, Agent, or Firm* — Patterson & Sheridan LLP

(57) ABSTRACT

Techniques are disclosed for automatically determining tests to run on source code based on code coverage. In one embodiment, an extensible system takes as input a configuration file having pointers to an IP address of a server where tests are being run and a type of code coverage instrumentation. An agent configured to instrument source code and collect code coverage information is copied to the server at the IP address. During a training phase, the agent intercepts tests being run on source code and provides a dump of the interception results after each test is executed. Using such results, mappings of the tests to the source code is created and stored. During an execution phase, when new or modified source code file is being checked in, a testing application retrieves for execution tests which map to the source code file and to code dependent on the source code file.

15 Claims, 4 Drawing Sheets

METHOD AND SYSTEM FOR DETERMINING FUNCTIONAL TESTS TO EXECUTE BASED ON CODE COVERAGE

BACKGROUND

Software testing is commonly used to ensure that software is stable and functions as expected, among other things. When a source code file is checked in to a source control system that merges working copies of code (referred to as "branches"), the system may build software from the source code and run tests on the software that is built. However, such tests are typically high-level static tests that have no relevance to the particular source code that was checked in. As a result, the testing may not be targeted to the checked-in code and hence provides a lower level of guaranteed stability on a given branch.

SUMMARY

One embodiment provides a computer-implemented method for testing source code. The method generally includes intercepting tests run on a first version of source code to determine the tests being run and code coverage from running the tests, and storing mappings of the determined tests to the first version of the source code and the determined code coverage in a database. The method further includes, upon a second version of the source code being checked in, determining a set of tests to run on the second version of the source code and code that is dependent on the second version of the source code, based on stored mappings and code coverage information in the database. In addition, the method includes running the determined set of tests on the second version of the source code and the dependent code.

Further embodiments of the present invention include a non-transitory computer-readable storage medium storing instructions that, when executed by a computer system, cause the computer system to perform the method set forth above, and a computer system programmed to carry out the method set forth above.

DETAILED DESCRIPTION

Embodiments presented herein provide techniques for automatically determining tests to run on source code based on code coverage. As used herein, code coverage refers to the degree to which source code (e.g., a percentage or number of lines of the source code) is tested by a software test. One embodiment provides an extensible system that takes as input a configuration file including pointers to an IP address of a server where tests are run by a quality engineer (QE) on a type of code coverage instrumented product binary, among other things. An agent that is configured to interpret the type of code coverage instrumentation and collect code coverage information is then copied over to the server at the IP address. As the QE runs tests on source code, the agent quietly intercepts the testing, collects the code coverage information to map each test to corresponding source code, and provides the mappings and associated code coverage results to a learning system where the mappings and code coverage information may be persisted in a database. The code coverage information may be provided at, for example, the source code file level of granularity (e.g., test X maps to files A, B, C) or at the source code line level of granularity (e.g., test Y maps to lines AA, BB, CC of file A).

When a new or modified source code file is checked in, a testing application queries the database to retrieve a list of tests relevant to the source code file (or specific lines of code or methods, etc., if tests are mapped to lines of code or methods, etc.) and code that is dependent on the source code file. That is, a reverse mapping of the source code file (and dependent code) to tests is used to identify relevant tests to run, based on the mappings of tests to source code stored in the database. If too many relevant tests are identified, then adequate code coverage may be obtained without running all relevant tests, and the testing application may limit the number of tests to run according to a blacklist. Conversely, if no relevant tests or too few relevant tests are identified, then the testing application may add one or more default tests specified in a whitelist to improve code coverage. The testing application then runs the tests on the source code being checked in and the dependent code.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
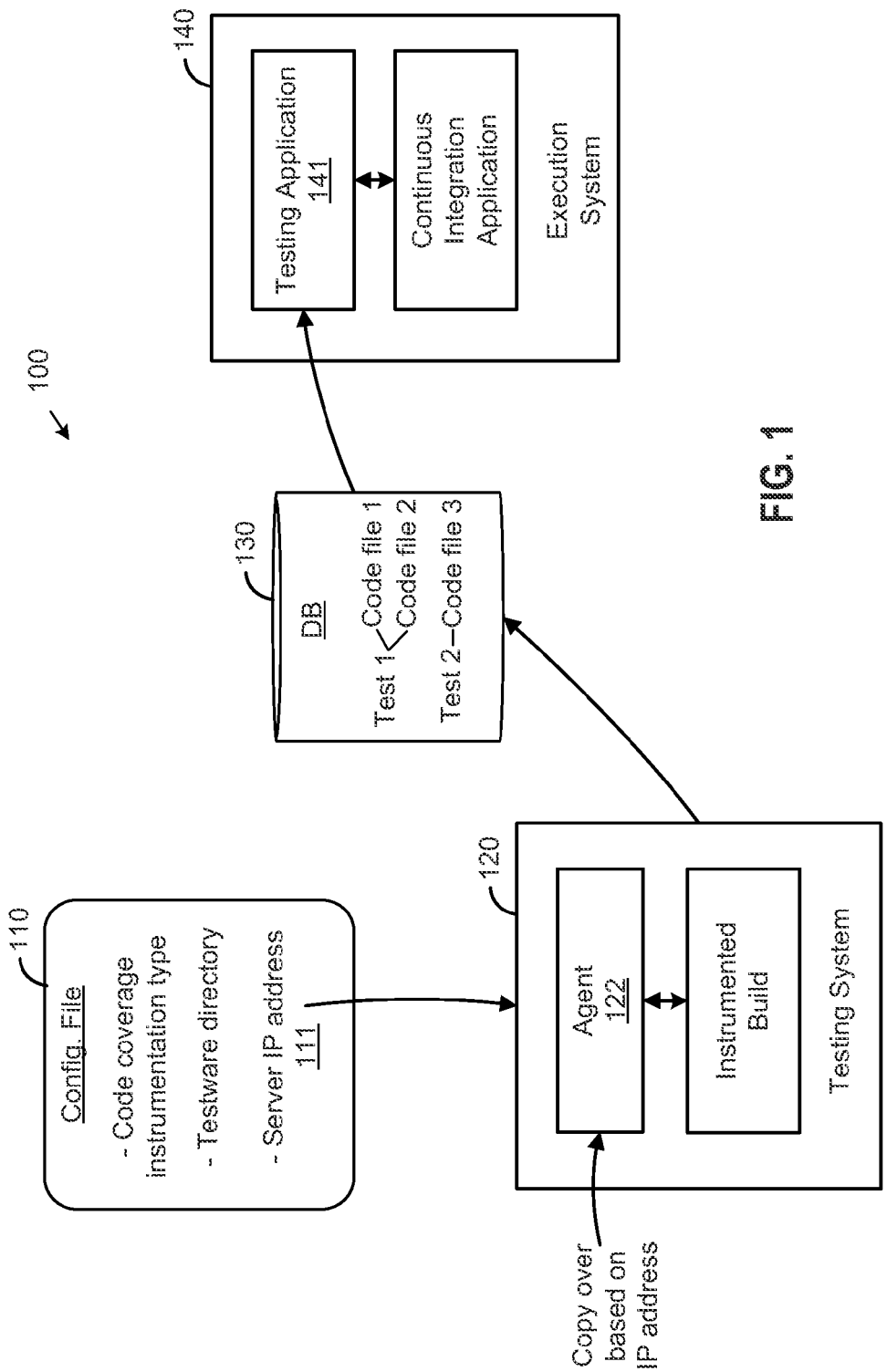
FIG. 1 illustrates an approach for determining and executing functional tests based on code coverage, according to an embodiment.

FIG. 1 illustrates an approach for determining and executing functional tests based on code coverage, according to an embodiment. As shown, an agent 122 running in a testing system 120 is responsible for interpreting the type of instrumentation in the source code and measuring and reporting code coverage, as a fractional value and/or on a line-by-line or method-by-method basis. In one embodiment, the type of code coverage instrumentation is specified in a configuration file 110, which may also specify where tests are stored, an identifier (ID) of the product whose source code is being tested, among other things. Illustratively, configuration file 110 further includes a pointer 111 to an Internet Protocol (IP) address of testing system 120, and agent 122 is copied over to testing system 120 based on this IP address.

During an initial learning phase, agent 122 that is copied to testing system 120 and runs therein to intercept tests being performed and to determine code coverage. In one embodiment, a code coverage instrumentation tool (e.g., JaCoCo) may instrument the source code, either through static instrumentation performed on binary files that are then compiled or dynamic instrumentation of code that is loaded in memory. As tests are being run, the instrumented instructions provide, e.g., counters indicating the number of times particular lines of code, methods, etc. have been executed. Agent 122 is configured to interpret such instrumentation and determine based on, e.g., the counter values, which lines or methods of the source code are executed, also referred to as code coverage. For example, the counters in the instrumented code may indicate that a particular line of code was executed three times, or a particular function was executed five times, during testing. Agent 122 is responsible for understanding what the two and five times means and changing this information into a format, namely a mapping between the test and portions of source code, that is then persisted in database 130. Agent 122 may also be configured to determine other information, such as cyclomatic dependency (indicating the number of decision points in the tests that are executed). It should be understood that different code coverage instrumentation tools may be employed, and each code coverage instrumentation tool may instrument the code differently and employ different communication protocols. In one embodiment, agent 122 is able to interpret instrumentation by a variety of code coverage instrumentation tools, with the particular type of code coverage instrumentation to interpret being specified in configuration file 110, as discussed above. Alternatively, different types of agents 122 capable of interpreting respective coverage instrumentations may be copied to the IP address of testing system 120, based on the code coverage instrumentation tool type specified in configuration file 110.

After each test is run, agent 122 maps portions of the source code indicated by the code coverage instrumentation to the test and reports the mapping to testing application 141. For example, if test A were run on source code file X, agent 122 may generate a dump of code coverage instrumentation results showing that test A affected particular lines or methods in source code file X. Testing application 141 may then store the mapping of test A to file X, or the particular lines or methods in file X, and the associated code coverage information in database 130. It should be understood that the mapping need not be relearned each time the test is run on the source code, and testing application 142 may instead monitor learned tests and only relearn tests that have changed. That is, new tests or modified tests may be learned at a delta level.

During an execution phase after the learning phase, testing application 141 polls a continuous integration system (e.g., Perforce® revision control system) to determine if a new version of a source code file is being checked in. Such a source code file may be a new file or an existing file that has been modified by a developer. In one embodiment, the source code may be tested in a pre-check in step prior to actually checking in the code to a branch to ensure that the branch is not destabilized by untested code. Upon determining that a new version of a source code file is being checked in, testing application 141 automatically retrieves a list of tests relevant to the source code file by querying database 130 for tests which map to the source code file, if any. That is, testing application 141 reverse maps the source code file (or lines of code) to relevant tests, based on the mappings stored in the database 130. Relevant tests may include tests satisfying any feasible criteria, such as tests having some desired code coverage or cyclomatic dependency score. Testing application 141 then runs the relevant tests.

In addition, testing application 141 may retrieve tests relevant to source code which depends on the new version of the source code file. It should be understood that only running tests on the source code being checked in may be insufficient, as application programming interfaces (APIs) within such source code may be used by other dependent code. To provide the best possibility of branch stability, the dependent code may also be tested using relevant tests.

In another embodiment, a blacklists and/or whitelist may be employed to limit or increase the number of tests that are run, respectively. When too many relevant tests are identified, then adequate code coverage may be achieved by running a subset of the relevant tests, and testing application 114 may limit the number of tests that are run according to the blacklist. For example, the blacklist may specify that when a file is touched by greater than 80% of the total tests, then a subset of those tests needed to reach 100% code coverage or some fixed number (e.g., 10) of tests with the greatest code coverage should be used. Conversely, if no relevant tests or too few relevant tests are identified, then the testing application may add default tests specified in a whitelist to improve code coverage.

Figure 2:
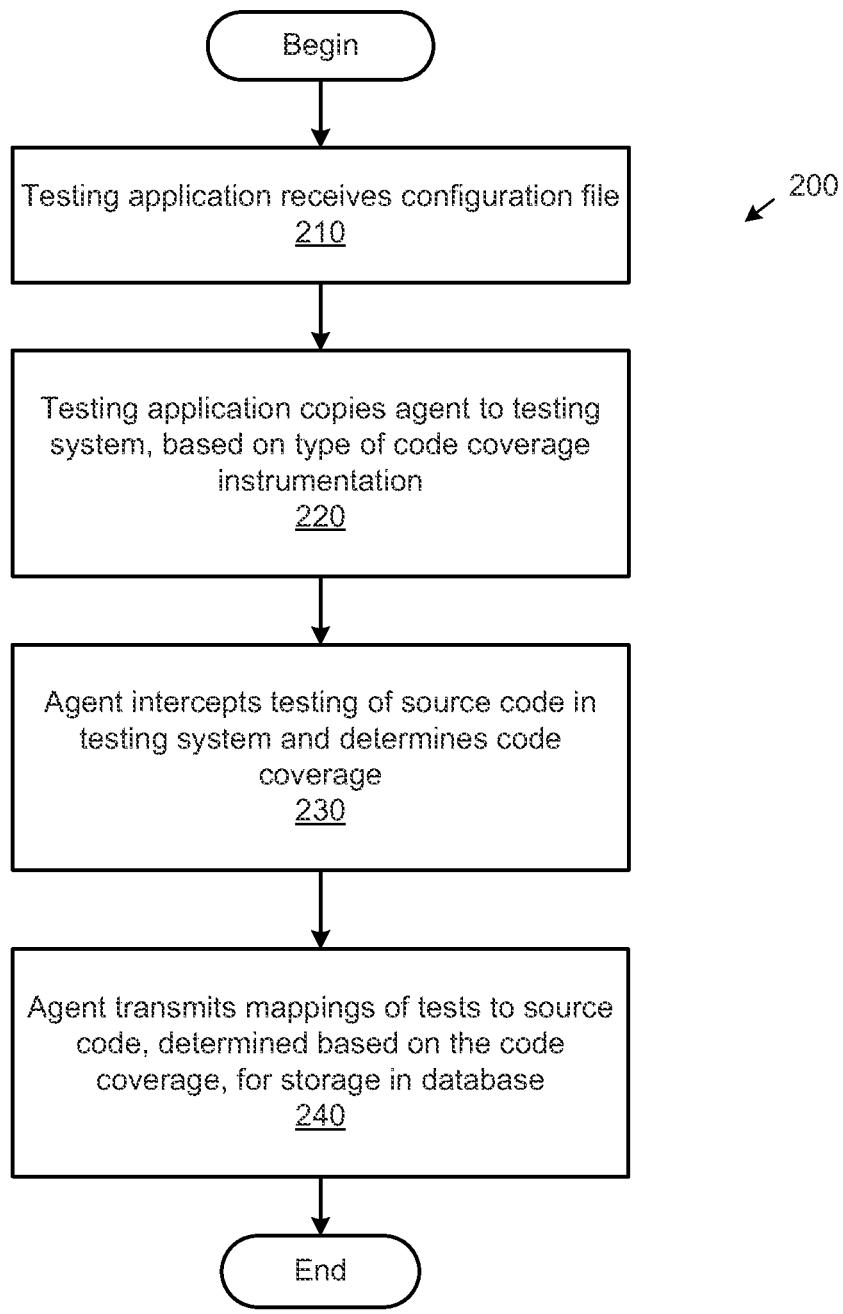
FIG. 2 illustrates a method for learning mappings of functional tests to source code and code coverage, according to an embodiment.

FIG. 2 illustrates a method 200 for learning mappings of functional tests to source code and code coverage, according to an embodiment. As shown, the method 200 begins at step 210, where testing application 141 receives configuration file 110 which may specifying a server IP address, type of code coverage tool, where tests are stored, an ID of the product whose source code is being test, among other things. At step 220, testing application 141 copies agent 122 to testing system 120, based on the IP address or hostname specified in configuration file 110.

At step 230, agent 122 intercepts testing of source code in testing system 120 and determines code coverage. As discussed, a code coverage instrumentation tool may instrument the source code, either through static instrumentation performed on binary code files before compilation or dynamic instrumentation of code that is loaded in memory, to collect code coverage information. During testing, the instrumented instructions trace which portions of the code are being executed and provide, e.g., counters indicating the number of times particular lines of code, methods, etc. have been executed, so that agent 122 can determine the portions of code that are touched by the testing, i.e., the code coverage. After each test is run and agent 122 gathers code coverage information for that test, agent 122 sends a signal (e.g., a TCP/IP message) reporting the gathered information and the test run to testing application 141. This process is repeated after each test is run so that the test-to-source code mapping is clear.

At step 240, agent 122 transmits mappings of tests to source code, determined based on the code coverage, to testing application 141 for storage in database 130. Testing application 141 may then store the mappings of tests to source code provided by agent 122 in database 130. As discussed, information on code coverage is gathered for each test and reported by agent 122 to testing application 141. As a result, testing application 141 is aware of the tests that have been run on each source code file as well as the code coverage of those tests. The mapping of source code to tests that is determined and stored may be at, e.g., the source code file level of granularity, or at the source code line level of granularity. At the source code file level, source code files may be mapped to the test(s) executed on the files. At the source code line level, particular lines of the source code may be mapped to test(s) executed on those lines. Such mappings, as well as the code coverage information specifying the degree to which the source code files or lines are tested by each test, are persisted in database 130 for later use in testing new or modified source code as such code is checked in.

Figure 3:
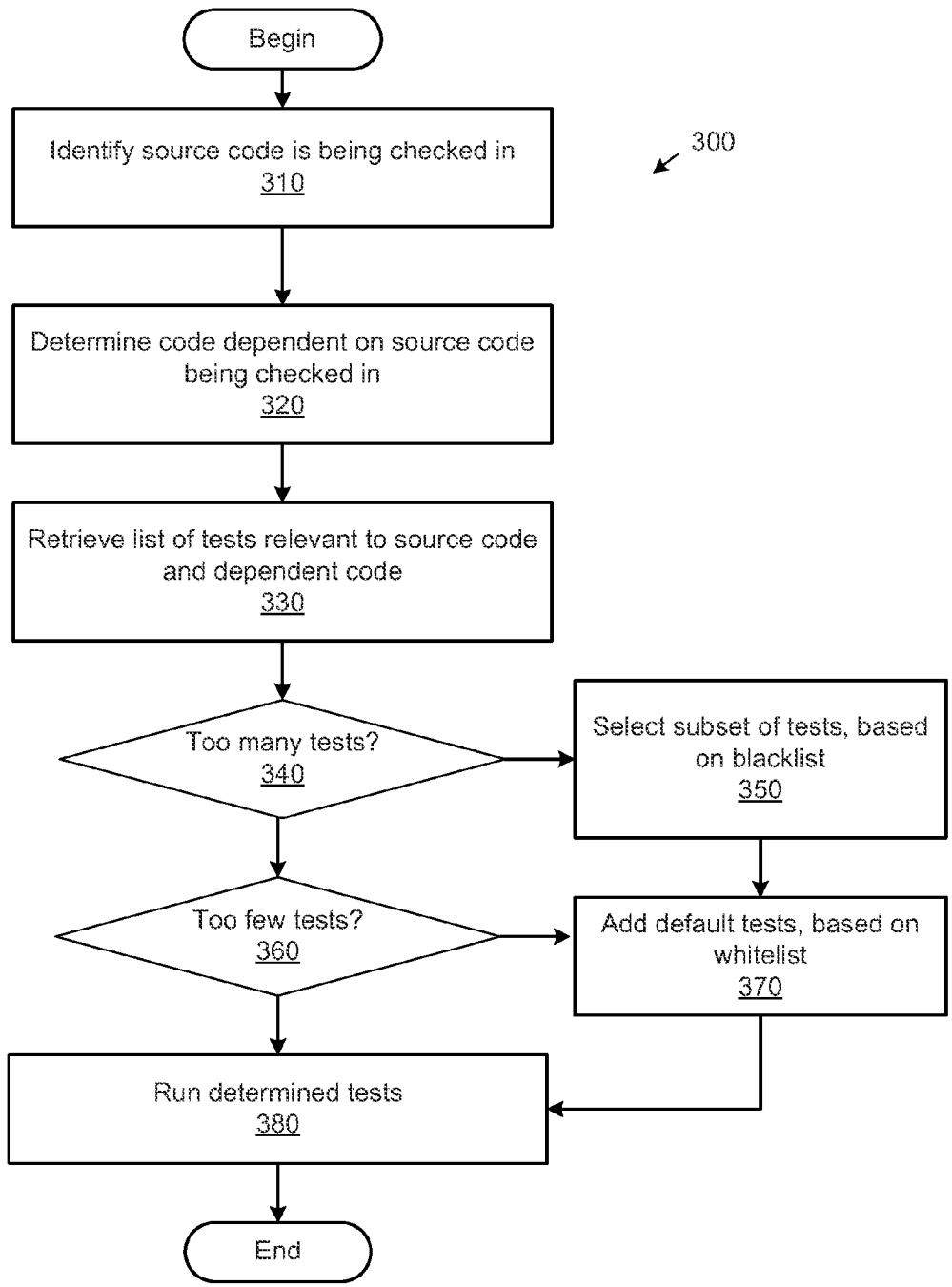
FIG. 3 illustrates a method for testing source code being checked in, according to an embodiment.

FIG. 3 illustrates a method 300 for testing source code being checked in, according to an embodiment. As shown, the method 300 begins at step 310, where testing application 141 identifies that source code is being checked in. In one embodiment, testing application 141 may poll a continuous integration system to determine if a new version of a source code file is being checked in. In another embodiment, the source code may be tested in a pre-check in step prior to actually checking in the code to a branch to ensure that the branch is not destabilized by untested code.

At step 320, testing application 141 determines dependents of the source code being checked in. As previously noted, only running tests that affect the source code being checked in may be insufficient, so testing application 141 may crawl through the source code to store dependent application-programming interfaces (APIs) within such source code that may be used by other dependent source code. To provide the best possibility of branch stability, tests should and can also be run on the dependent source code as well.

In one embodiment, dependent code may be identified as classes, which import a class in the source code being checked in. In another embodiment, functional dependencies in the source code may be provided in a heat map that the testing application 141 then uses to identify dependent code.

At step 330, testing application 141 retrieves a list of tests relevant to the source code and dependent source code from database 130. As discussed, database 130 is populated with mappings of source code to tests and associated code coverage during a learning phase, with the mappings being at, e.g., the source code file, method, or source code line level of granularity. Testing application 141 may then query database 130 to retrieve the list of relevant tests which map back to the source code, as well as code coverage associated with those tests.

It should be understood that not all tests mapping to the source code and the dependent code need to be retrieved. Testing application 141 may instead query for relevant tests matching any feasible criteria, such as having some desired code coverage or cyclomatic dependency score.

At step 340, testing application 141, determines whether there are too many relevant tests. There may be too many relevant tests if a large number of tests were previously run on the source code being checked in and the mappings of these tests to the source code were then stored in database 130. For example, thousands of tests may be relevant to a common source code file, and it may take an unacceptable amount of time to run all of those tests.

In one embodiment, whether there are too many relevant tests may be determined based on criteria specified in a blacklist. Such a blacklist may be included in the configuration file 110, discussed above.

If there are too many relevant tests, then at step 350, testing application 141 selects a subset of the relevant tests, based on the blacklist. As discussed, the blacklist may be added to configuration file 110 by a user and specifies the tests to run when too many relevant tests are identified. In one embodiment, the blacklist may specify that a given number of tests or tests providing a given code coverage percentage should be run. For example, the blacklist may specify, e.g., that when a file is touched by greater than 80% of the total tests, then a subset of those test needed to reach 100% coverage or some fixed number (e.g., 10) of tests with the greatest code coverage should be used.

If there are not too many relevant tests, then testing application 141 further determines, at step 360, whether there are too few relevant tests. There may be too few relevant tests if, e.g., a new source code file is checked in that is not yet mapped to any tests or a source code file mapping to very few tests is checked in. In such cases, tests other than the relevant tests determined from mappings in database 130 may need to be run to provide sufficient code coverage.

If there are too few relevant tests, then testing application 141 adds a set of default tests at step 370, based on a whitelist. Similar to the blacklist, the whitelist may be added to configuration file 110 by a user. Such a whitelist may specify the set of default tests to run when there are too few relevant tests for the source code.

At step 380, testing application 141 runs the determined tests. As discussed, these tests may include tests relevant to the source code, a subset of the relevant tests specified by a blacklist, and/or default tests from a whitelist. Results of the testing may then be displayed to a user through a user interface (UI) listing, e.g., the tests that were run, the percentage coverage achieved, results of the testing, and the like.

Figure 4:
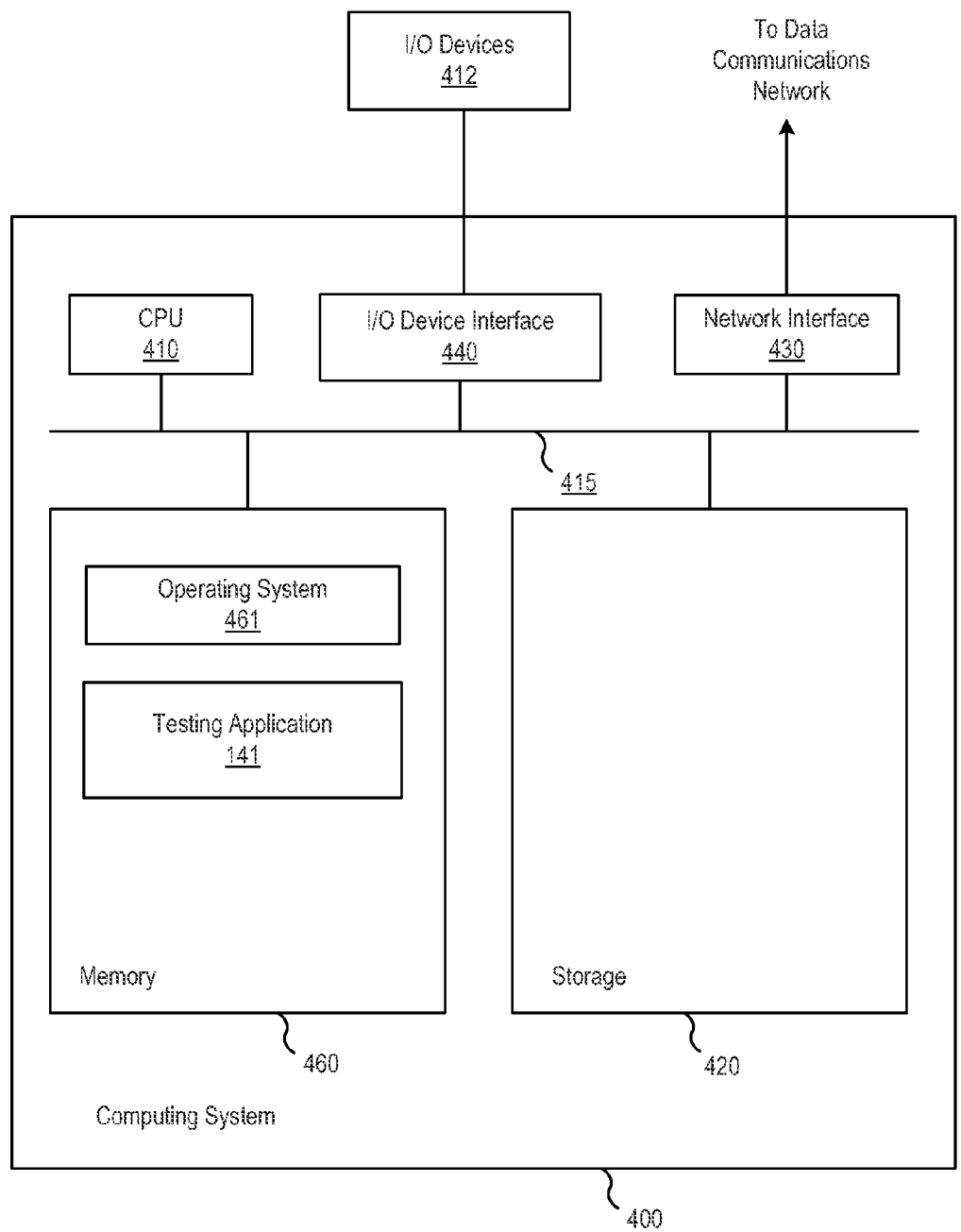
FIG. 4 illustrates a system in which a testing application may be implemented.

FIG. 4 illustrates a system 400 in which testing application 141 may be implemented. As shown, system 400 includes, without limitation, a central processing unit (CPU) 410, a network interface 430, an interconnect 415, a memory 460 and storage 420. System 400 may also include an I/O device interface 440 connecting I/O devices 450 (e.g., keyboard, display and mouse devices) to the system 400.

CPU 410 retrieves and executes programming instructions stored in the memory 460. Similarly, CPU 410 stores and retrieves application data residing in the memory 460. Interconnect 415 facilitates transmission, such as of programming instructions and application data, between CPU 410, I/O device interface 440, storage 420, network interface 430, and memory 460. CPU 410 is included to be representative of a single CPU, multiple CPUs, a single CPU having multiple processing cores, and the like. And memory 460 is generally included to be representative of a random access memory. Storage 420 may be a disk drive storage device. Although shown as a single unit, storage 420 may be a combination of fixed and/or removable storage devices, such as fixed disc drives, floppy disc drives, tape drives, removable memory cards or optical storage, network attached storage (NAS), or a storage area-network (SAN). Further, system 400 is included to be representative of a physical computing system as well as virtual machine instances hosted on a set of underlying physical computing systems. Further still, although shown as a single computing system, one of ordinary skill in the art will recognized that the components of system 400 shown in FIG. 4 may be distributed across multiple computing systems connected by a data communications network.

As shown, memory 460 includes an operating system 461 and testing application 141. In one embodiment, testing application 142 may be configured to, in conjunction with agent 122, automatically learn mappings of source code to tests and persist such mappings in a database, according to the method 200 discussed above. In addition, testing application 141 may identify when new versions of source code are being checked in, determine dependent code, and retrieve and run one or more relevant tests based on the mappings which have been stored in the database, according to the method 300 discussed above.

Advantageously, techniques disclosed herein map tests to source code so that when a source code file is checked in after modification, a reverse mapping can be used to automatically retrieve tests to run for the source code file and other source code dependent on it. Doing so permits, e.g., a set of tests with desired code coverage and that runs in a short period of time to be used. Further, techniques disclosed herein are extensible in the sense that the agent is able to interpret different types of code coverage instrumentation and create the mappings of tests to source code. The particular type of code coverage instrumentation used simply needs to be specified in a configuration file. In addition, a blacklist may be employed where a source code file (or line of source code) maps to too many tests providing repeated coverage to reducing the number of tests that are run. Conversely, where the source code file (or line) maps to no tests or too few tests, a set of default tests specified in a whitelist may be run to provide some code coverage.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for testing source code, comprising:
   receiving a configuration file specifying an Internet Protocol (IP) address of a server which runs tests on source code and a type of code coverage instrumentation used in the tests;
   copying an agent, which is configured to interpret the type of code coverage instrumentation specified in the configuration file, to the server based on the IP address of the server;
   intercepting, by the agent, tests run on a first version of the source code at the server specified in the configuration file, based on the type of code coverage instrumentation specified in the configuration file, to determine the tests being run and code coverage from running the tests;
   storing, in a database, mappings of the determined tests to portions of the first version of the source code based on the determined code coverage;
   responsive to a second version of the source code being checked in, determining a set of tests to run on the second version of the source code and code that is dependent on the second version of the source code based on the stored mappings in the database, wherein the code that is dependent on the second version of the source code includes code determined to use application programming interfaces (APIs) within the second version of the source code;
   running the determined set of tests on the second version of the source code and the dependent code; and
   re-learning one or more of the stored mappings subsequent to changes being made to one or more of the tests corresponding to the one or more of the stored mappings.

2. The method of claim 1, wherein the intercepting comprises running each of the tests and interpreting code coverage instrumentation.

3. The method of claim 1, wherein a blacklist is used in determining the set of tests to run on the second version of the source code, the blacklist specifying one or more criteria for determining tests to run in cases of repeated code coverage.

4. The method of claim 1, wherein a whitelist is used in determining the set of tests to run on the second version of the source code, the whitelist specifying a default set of tests to run.

5. The method of claim 1, wherein the stored mappings of the tests to the portions of the first version of the source code are mappings of the tests to source code files.

6. The method of claim 1, wherein the stored mappings of the tests to the portions of the first version of the source code are mappings of the tests to lines of the first version of the source code.

7. The method of claim 1, wherein the second version of the source code includes a class and the dependent code includes one or more other classes which import the class in the second version of the source code.

8. A non-transitory computer-readable storage medium containing one or more programs which, when executed by one or more processors, performs operations for testing source code, the operations comprising:

receiving a configuration file specifying an Internet Protocol (IP) address of a server which runs tests on source code and a type of code coverage instrumentation used in the tests;

copying an agent, which is configured to interpret the type of code coverage instrumentation specified in the configuration file, to the server based on the IP address of the server;

intercepting, by the agent, tests run on a first version of the source code at the server specified in the configuration file, based on the type of code coverage instrumentation specified in the configuration file, to determine the tests being run and code coverage from running the tests;

storing, in a database, mappings of the determined tests to portions of the first version of the source code based on the determined code coverage;

responsive to a second version of the source code being checked in, determining a set of tests to run on the second version of the source code and code that is dependent on the second version of the source code based on the stored mappings in the database, wherein the code that is dependent on the second version of the source code includes code determined to use application programming interfaces (APIs) within the second version of the source code;

running the determined set of tests on the second version of the source code and the dependent code; and re-learning one or more of the stored mappings subsequent to changes being made to one or more of the tests corresponding to the one or more of the stored mappings.

9. The computer-readable storage medium of claim 8, wherein the intercepting comprises running each of the tests and interpreting code coverage instrumentation.

10. The computer-readable storage medium of claim 8, wherein a blacklist is used in determining the set of tests to run on the second version of the source code, the blacklist specifying one or more criteria for determining tests to run in cases of repeated code coverage.

11. The computer-readable storage medium of claim 8, wherein a whitelist is used in determining the set of tests to run on the second version of the source code, the whitelist specifying a default set of tests to run.

12. The computer-readable storage medium of claim 8, wherein the stored mappings of the tests to the portions of the first version of the source code are mappings of the tests to source code files.

13. The computer-readable storage medium of claim 8, wherein the stored mappings of the tests to the portions of the first version of the source code are mappings of the tests to lines of the first version of the source code.

14. The computer-readable storage medium of claim 8, wherein the second version of the source code includes a class and the dependent code includes one or more other classes which import the class in the second version of the source code.

15. A system, comprising:

a processor; and a memory, wherein the memory includes one or more programs configured to perform operations for testing source code, the operations comprising:

receiving a configuration file specifying an Internet Protocol (IP) address of a server which runs tests on source code and a type of code coverage instrumentation used in the tests, copying an agent, which is configured to interpret the type of code coverage instrumentation specified in the configuration file, to the server based on the IP address of the server, intercepting, by the agent, tests run on a first version of the source code at the server specified in the configuration file, based on the type of code coverage instrumentation specified in the configuration file, to determine the tests being run and code coverage from running the tests, storing, in a database, mappings of the determined tests to portions of the first version of the source code based on the determined code coverage, responsive to a second version of the source code being checked in, determining a set of tests to run on the second version of the source code and code that is dependent on the second version of the source code based on the stored mappings and code coverage information in the database, wherein the code that is dependent on the second version of the source code includes code determined to use application programming interfaces (APIs) within the second version of the source code, running the determined set of tests on the second version of the source code and the dependent code, and re-learning one or more of the stored mappings subsequent to changes being made to one or more of the tests corresponding to the one or more of the stored mappings.

* * * * *